(No Model.)
J. SCHILLING.
PAPER ROLLING MACHINE.
No. 468,728. Patented Feb. 9, 1892.
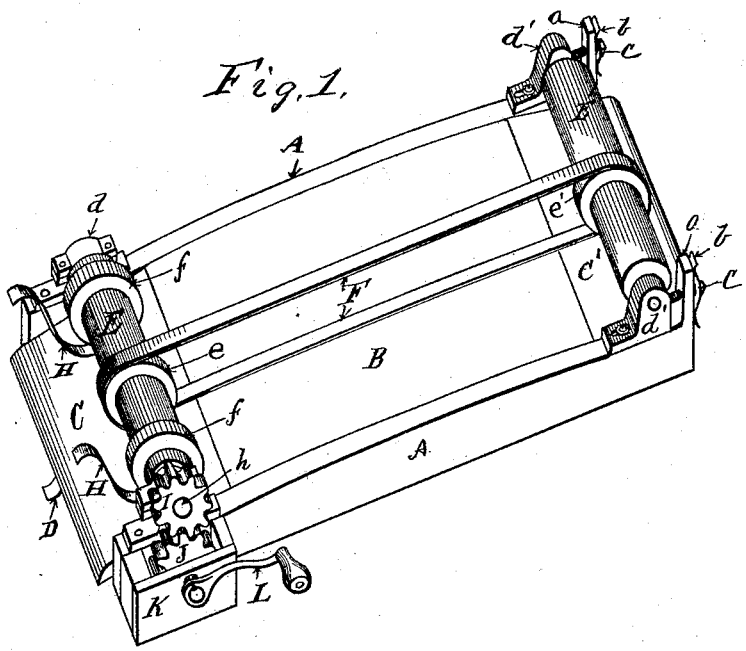
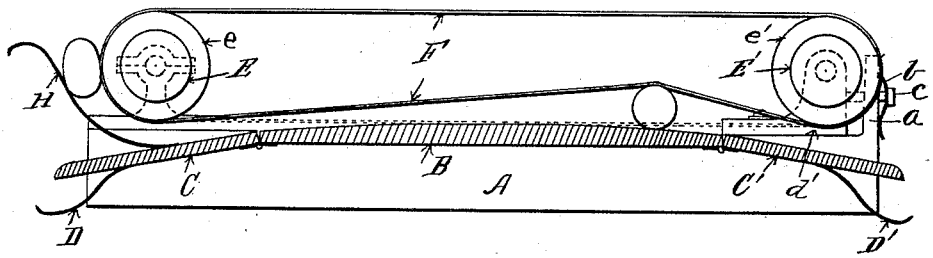
Witnesses
F. J. Barnett
A. L. Jackson
Inventor
Joseph Schilling
By Sturgeon
Atty.
THE NORRIS PETERS CO., PHOTO-LITHO., WASHINGTON, D. C.

UNITED STATES PATENT OFFICE.

JOSEPH SCHILLING, OF ERIE, PENNSYLVANIA, ASSIGNOR OF ONE-HALF TO DANIEL KOSTER, OF SAME PLACE.

PAPER-ROLLING MACHINE.

SPECIFICATION forming part of Letters Patent No. 468,728, dated February 9, 1892.

Application filed August 10, 1891. Serial No. 402,326. (No model.)

*To all whom it may concern:*

Be it known that I, JOSEPH SCHILLING, a citizen of the United States, residing at Erie, in the county of Erie and State of Pennsylvania, have invented certain new and useful Improvements in Paper-Rolling Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in paper-rolling machines hereinafter set forth and explained, and illustrated in the accompanying drawings, in which—

Figure 1 is a perspective view of my improved paper-rolling machine. Fig. 2 is a section of the same in elevation.

The object of my invention is to provide a machine through which rolls of wall-paper which have become flattened or crushed out of shape may be passed and restored to a cylindrical shape.

In the construction of my paper-rolling machine shown in the drawings, A is the frame of the machine; B, a flat surface over which the paper-rolls are rolled; C and C' are hinged to the ends of the portion B and are provided with springs D and D', the outer ends of which rest upon the table upon which the machine stands when in operation so as to permit the hinged portions C and C' of the platform to be depressed, as and for the purpose hereinafter set forth. In the bearings $d$ and $d'$ on the ends of the frame A are rollers E and E'. Collars $e$ and $e'$ are provided at the centers of these rollers, around which the endless belt F passes. The bearings $d'$, supporting the roller E', are preferably made movable by means of set-screws $c$, passing loosely through lugs $a$ on the end of the frame A into the bearings $d'$, which set-screws $a$ are provided with springs $b$ under the heads thereof, which operate upon the bearings $d'$, supporting the roller E', to keep the belt F at the proper tension.

Around the ends of the roller E are collars $ff$, of rubber or other resilient material, and opposite to these collars I secure to the yielding portion C of the platform upwardly-projecting curved springs H H, between which springs and the collars $ff$ on the roller E the roll of paper to be rounded is placed.

On the outer end of the bearing $h$ of the roller E, I preferably place a spur-gear I, which intermeshes with a similar spur-gear J, mounted in a bearing K on the side of the frame A, and a crank L is secured to the journal of the spur-gear J for operating the machine, the object of the gearing being for the purpose of facilitating the operation of the machine, it enabling the operator to turn the machine with one hand and feed the rolls into it with the other.

In operation the rolls of paper are placed in the machine between the springs H H and the collars $ff$ on the roller E, as illustrated in Fig. 2, the revolving of the roller E carrying the roll down under the roller E and belt F, by means of which it is rolled over the platform B, as illustrated in Fig. 2, until it finally passes out under the roller E', the yielding portion C of the platform moving downward sufficiently to permit the roll of paper to pass out under the roller E'.

Having thus fully described my invention, so as to enable others to construct and operate the same, what I claim as new, and desire to secure by Letters Patent of the United States, is—

1. The combination, in a paper-rolling machine, of a fixed platform, a section hinged to each end of said platform, with a roller mounted on bearings at each end of said frame above the hinged portion of the platform, and an endless belt around said rollers, substantially as and for the purpose set forth.

2. The combination, in a paper-rolling machine, of a platform, as B, sections C and C', hinged to the ends thereof, and upwardly-projecting springs, as H H, secured to the hinged section C of the platform, with a roller, as E, having collars, as $ff$, thereon, mounted in bearings, as $d$, above the hinged section C of the platform, a roller, as E', mounted in movable bearings, as $d'$, above the hinged section, as C', of the platform, an endless belt, as F, around the central portions of said rollers E E', gearing, as I and J, and a crank, as L, for rotating the roller E, substantially as and for the purpose set forth.

In testimony whereof I affix my signature in presence of two witnesses.

JOSEPH SCHILLING.

Witnesses:
H. J. CURTZE,
G. J. MEAD.